(12) United States Patent
Condorelli et al.

(10) Patent No.: US 12,411,169 B2
(45) Date of Patent: Sep. 9, 2025

(54) SYSTEM ON CHIP INCLUDING A PVT SENSOR AND CORRESPONDING PVT SENSING METHOD

(71) Applicant: STMicroelectronics S.r.l., Agrate Brianza (IT)

(72) Inventors: Riccardo Condorelli, Tremestrieri Etneo (IT); Antonino Mondello, Messina (IT); Michele Alessandro Carrano, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 268 days.

(21) Appl. No.: 18/089,764

(22) Filed: Dec. 28, 2022

(65) Prior Publication Data
US 2023/0213578 A1 Jul. 6, 2023

(30) Foreign Application Priority Data
Jan. 3, 2022 (FR) .................................. 2200018

(51) Int. Cl.
*G01R 31/317* (2006.01)
*G01R 31/3173* (2006.01)

(52) U.S. Cl.
CPC . *G01R 31/31703* (2013.01); *G01R 31/31725* (2013.01); *G01R 31/3173* (2013.01)

(58) Field of Classification Search
CPC ........ G01R 31/31703; G01R 31/31725; G01R 31/3173; G01R 31/2851; G01R 31/2874; G01R 31/2879; G06F 21/755; G06F 11/3058; G06F 11/3072; G06F 21/71
See application file for complete search history.

(56) References Cited

U.S. PATENT DOCUMENTS

| | | | | |
|---|---|---|---|---|
| 10,107,855 | B1 * | 10/2018 | Corbett | ............... G01R 31/2851 |
| 10,937,509 | B1 * | 3/2021 | Lam | ........................ G11C 5/148 |
| 11,804,825 | B1 * | 10/2023 | Logelin | ................... H03K 5/133 |
| 2008/0197900 | A1 | 8/2008 | Chae | |
| 2013/0311792 | A1 | 11/2013 | Ponnathota et al. | |

(Continued)

FOREIGN PATENT DOCUMENTS

| | | |
|---|---|---|
| EP | 3855625 A1 | 7/2021 |
| KR | 1020120012386 A | 2/2012 |

OTHER PUBLICATIONS

INPI Search Report and Written Opinion for priority application, FR 2200018, report dated Sep. 15, 2022, 8 pgs.

(Continued)

*Primary Examiner* — Lee E Rodak
*Assistant Examiner* — Zannatul Ferdous
(74) *Attorney, Agent, or Firm* — Crowe & Dunlevy LLC (57) ABSTRACT

A system-on-chip includes a process-voltage-temperature (PVT) sensor with a filter circuit that initiates a patterned digital signal and propagates the patterned digital signal in a manner responsive to variations in semiconductor material, operating supply voltage and operating temperature of the system-on-chip. A digital comparison circuit compares the initiated patterned digital signal and the propagated patterned digital signal. A warning signal is generated in response to the comparison where there is a detection of discrepancy between the initiated patterned digital signal and the propagated patterned digital signal.

34 Claims, 9 Drawing Sheets

(56) References Cited

U.S. PATENT DOCUMENTS

| | | | |
|---|---|---|---|
| 2016/0173090 A1* | 6/2016 | Meinerzhagen | H03K 19/00323 327/145 |
| 2017/0102754 A1* | 4/2017 | Chi | G06F 1/10 |
| 2017/0277211 A1* | 9/2017 | Li | H03K 5/08 |
| 2018/0241409 A1 | 8/2018 | Dagher et al. | |
| 2023/0213578 A1* | 7/2023 | Condorelli | G01R 31/31725 324/750.3 |

OTHER PUBLICATIONS

Wang Jinn Shyan et al: "Process/Voltage/Temperature-Variation-Aware Design and Comparative Study of Transition Detector Based Error Detecting Latches for Timing Error Resilient Pipelined Systems", IEEE Transactions on Very Large Scale Integration (VLSI) Systems, Piscataway NJ USA, vol. 25 No 10, Oct. 1, 2017 pp. 2893-2906.

CN First Office Action and Search Report for counterpart CN Appl. No. 202211733839.7, report dated Aug. 2, 2025, 10 pgs.

\* cited by examiner

SYSTEM ON CHIP INCLUDING A PVT SENSOR AND CORRESPONDING PVT SENSING METHOD

PRIORITY CLAIM

This application claims the priority benefit of French Application for Patent No. 2200018, filed on Jan. 3, 2022, the content of which is hereby incorporated by reference in its entirety to the maximum extent allowable by law.

TECHNICAL FIELD

Embodiments concern integrated circuits such as system on chips, including a process-voltage-temperature (PVT) sensor, and corresponding PVT sensing method.

BACKGROUND

As is well known, an electronic device incorporating a system on chip, such as a smartphone or a device for industrial or automotive applications, may be subject to external attack by an unauthorized user for the purpose of tampering with the electronic device and/or gaining access to data stored in the electronic device.

For example, in order to tamper with the system on chip, an unauthorized user may vary an operating supply voltage or change the operating temperature of the system of chip with the purpose of inducing the system-on-a-chip into an error state. Other error inducing techniques may take action on a clock signal by tweaking frequency, or on a physical behavior of silicon or other semiconductors by electromagnetic or laser stimulation. The unauthorized user could then exploit such a malfunction to gain access to the system-on-a-chip.

In fact, if the operating conditions such as supply voltage, temperature, frequency, or semiconductor physics are changed outside of a nominal operating range, the system-on-chip could enter a malfunction state and behave unexpectedly.

This causes a security issue in relation with a voluntary alteration of operating condition for tampering with the system of chip.

This also causes a safety issue in relation with an involuntary alteration of operating condition, for instance implied by a critical environment such as the automotive domain, where extreme temperatures can be reached and where electrical failure (such as supply voltage drop) can happen due to high energy requested by electric engines used at high performance.

Classical techniques for detecting changes in operating conditions outside of the nominal operating range are typically based on direct supply voltage measurement and direct temperature measurement, and imply extra silicon and power consumption to accommodate such sensors in the system on chip.

Moreover, classical techniques for detecting changes in operating conditions are typically not linked with technology parameters. Technology parameters are the parameters related to the behavior of the semiconductor physics and are also called process variations. These technologies are thus not able to detect clock frequency tweaking, or alteration of semiconductor behavior by electromagnetic or laser stimulation.

In addition, the classical sensors of changes in operating conditions are typically hardware based and invariable, that is to say that the detection trigger is fixed at the manufacturing stage. Thus, a customer cannot configure a more or less sensitive detection trigger depending on its peculiar application.

Hence, there is a need to provide a device and a method for preventing the aforementioned security and safety issues, and that can overcome the disadvantages of the classical techniques.

SUMMARY

According to embodiments of the aspects provided hereinafter, it is proposed to provide a configurable hardware tool able to detect an out of range operating condition by using the same components which make all the circuits inside the system on chip and based on the physical process-voltage-temperature conditions. In other words, in proposed embodiments, the technology tells the user that the system is going to fail, and is thus able to detect any nature of tampered conditions for security and safety purposes.

According to an aspect, it is proposed a system-on-chip including a process-voltage-temperature (PVT) sensor comprising a filter circuit configured to initiate a patterned digital signal and propagate the patterned digital signal in a manner responsive to variations in semiconductor material, operating supply voltage and operating temperature of the system-on-chip, and a digital comparison circuit configured to compare the initiated patterned digital signal and the propagated patterned digital signal, and to generate a warning signal in the case there is a detection of discrepancies between the compared patterned digital signals.

By the term "responsive to", it is meant "dependent of", or "impacted by", for example in such a manner that the filter circuit is configured to propagate the patterned digital signal according to a nominal behavior not modifying the patterned digital signal when the operating conditions are inside a nominal range, and to propagate the patterned digital signal according to a tampered behavior modifying the patterned digital signal when the operating condition are outside the nominal range.

Thus, by observing the discrepancies introduced on a patterned digital signal by the filter circuit, this aspect permits the detection of a modification of the properties of the circuit's material and components on the actual performance of the circuit (more particularly the filter circuit), providing a better information about the risk of failure than a detection of an isolated measure (such as classically a detection based on supply voltage measurement, or on temperature measurement).

According to an embodiment, the filter circuit includes a first flip-flop circuit configured to propagate the patterned digital signal, and a first delay circuit configured to delay the patterned digital signal at a data input of the first flip-flop circuit and configured responsive to variations in semiconductor material, operating supply voltage and operating temperature of the system-on-chip.

The first delay circuit located at the data input of the first flip-flop circuit permits detection of an increase in the duration of the delay, advantageously corresponding to a lowering of the system's speed below the nominal range, also called detection of setup violation.

For instance, the first delay circuit can be any digital cells where the intrinsic delay increases with temperature, a digital delay cell may be preferred because this type of digital cell is typically the most sensible.

According to an embodiment, the filter circuit includes a second flip-flop configured to propagate the patterned digital signal and to be cadenced by a clock signal, a second delay circuit configured to delay the patterned digital signal at a data input of the second flip-flop circuit and which is responsive to variations in semiconductor material, operating supply voltage and operating temperature of the system-on-chip, and a third delay circuit configured to delay the clock signal at the clock input of the second flip-flop circuit and which is less responsive to variations in semiconductor material, operating supply voltage and operating temperature of the system-on-chip than the second delay circuit.

The combination of the second and third delay circuit, respectively located at the data input and at the clock input of the second flip-flop circuit, detects a reduction in the duration of the delay, advantageously corresponding to an increase in the system's speed above the nominal range, also called detection of hold violation, for instance when the temperature becomes lower than the minimal nominal limit, and/or when the supply voltage is increased above the maximal nominal limit.

A hold timing violation happens with the configuration defined by this embodiment when the differences of the two delays is not within the nominal range.

According to an embodiment, the PVT sensor includes registers configured to store internal parameters determining the responsivity of the filter circuit to variations in semiconductor material, operating supply voltage and operating temperature of the system-on-chip.

According to an embodiment, the internal parameters include the delay duration of the respective delay circuit(s), for instance the first delay circuit in the embodiment firstly defined above, the second and third delays circuits in the embodiment secondly defined above, or the first, second and third delays circuits in the combination of these two embodiments.

The ability to configure the internal parameters permits to a user to set and modify the nominal range of the operating condition. Thus, according to this embodiment, the protection of the system on chip can be adapted to a specific condition of use, and to the criticality of the operation performed by the system on chip (such as a critical operation needing high security and safety protections).

According to an embodiment, the system-on-chip additionally includes peripheral circuits and at least one internal bus linking the peripheral circuits together in a respective bus domain, the PVT sensor being incorporated within the bus domain in a physical proximity to the peripheral circuits, and which is supplied with the same supply voltage and the same clock signal as the peripheral circuits of the bus domain.

According to an embodiment, the PVT sensor includes same components as the components of the peripheral circuits in the physical proximity to the PVT sensor.

Thus, in these embodiments, the PVT sensor truly acts the same way over the same operating conditions as the peripheral circuits in the corresponding bus domain, and provides an effective and practical detection of a potential failure or risk of failure.

According to an embodiment, the PVT sensor includes a bus interface configured to receive and to emit communications on the internal bus.

According to an embodiment, the system-on-chip includes a master unit configured to execute software operations comprising communicating configuration commands to the PVT sensor via the internal bus, the configuration commands configured to set the internal parameters of the PVT sensor.

According to an embodiment, the PVT sensor is configured to communicate the warning signal to a decisional unit via the internal bus.

In other words, in these embodiments, the PVT sensor (which is advantageously included within a bus domain of peripheral circuits) is controlled and operates like a peripheral circuit over the internal bus. This provides the ability of a wide variety of communications and configurations for the PVT sensor usage.

According to another aspect, there is proposed a method for sensing process-voltage-temperature (PVT) variations in a system-on-chip, comprising: initiating a patterned digital signal, propagating the patterned digital signal by a filter circuit in a manner responsive to variations in semiconductor material, operating supply voltage and operating temperature of the system-on-chip, digitally comparing the initiated patterned digital signal and the propagated patterned digital signal, and generating a warning signal in case of a discrepancy between the compared patterned digital signals.

According to an embodiment, propagating the patterned digital signal comprises passing through a first flip-flop circuit, and applying a first delay on the patterned digital signal at a data input of the first flip-flop circuit, the first delay being responsive to variations in semiconductor material, operating supply voltage and operating temperature of the system-on-chip.

According to an embodiment, propagating the patterned digital signal comprises passing through a second flip-flop circuit cadenced by a clock signal, applying a second delay on the patterned digital signal at the data input of the second flip-flop circuit, and applying a third delay on the clock signal at the clock input of the second flip-flop circuit, the second delay being responsive to variations in semiconductor material, operating supply voltage and operating temperature of the system-on-chip, the third delay being less responsive to variations in semiconductor material, operating supply voltage and operating temperature of the system-on-chip than the second delay.

According to an embodiment, the method further comprises storing in registers internal parameters determining the responsivity of the filter circuit to variations in semiconductor material, operating supply voltage and operating temperature of the system-on-chip, the internal parameters being configurable.

According to an embodiment, the internal parameters include the duration of the respective delay(s).

According to an embodiment, sensing process-voltage-temperature (PVT) variations is performed in a physical proximity to peripheral circuits linked together by at least one internal bus in a respective bus domain of the system-on-chip, and performed with the same supply voltage and the same clock signal as the peripheral circuits of the bus domain.

According to an embodiment, sensing process-voltage-temperature (PVT) variations is performed with same components as the components of the peripheral circuits in the physical proximity to the sensing.

According to an embodiment, the method comprises receiving and emitting communications on the internal bus via a bus interface including communication of configuration commands for setting the internal parameters, emitted from a master unit of the system-on-chip configured to execute software operations.

According to an embodiment, the method comprises communicating the warning signal to a decisional unit of the system-on-chip via the internal bus.

BRIEF DESCRIPTION OF THE DRAWINGS

Other advantages and specifications of the invention will appear at the review of the detailed description of embodiments, in no way limiting, and in relation with annexed drawings, amongst which.

DETAILED DESCRIPTION

Figure 1:
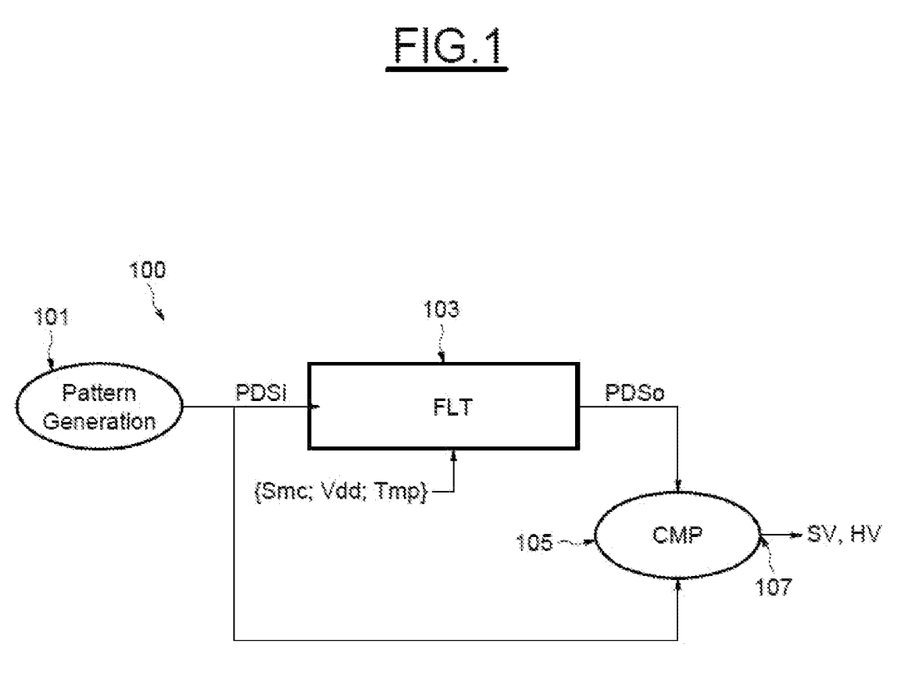
FIG. 1 illustrates a block diagram of a method for sensing process-voltage-temperature (PVT) variations in a system-on-chip.

FIG. 1 illustrates a block diagram of a method 100 for sensing process-voltage-temperature (PVT) variations in a system-on-chip SOC. The method 100 comprises initiating a patterned digital signal 101, propagating the patterned digital signal 103 by a filter circuit FLT and digitally comparing 105 the initiated patterned digital signal PDSi and the propagated patterned digital signal PDSo. The filter circuit is configured so that the propagation of the patterned digital signal PDSo is responsive to (i.e., "dependent of", or "impacted by") variations in semiconductor material Smc, operating supply voltage Vdd and operating temperature Tmp of the system-on-chip. The digital comparison 105 comprises generating a warning signal 107 in case of discrepancies between the compared patterned digital signals.

Figure 2A:
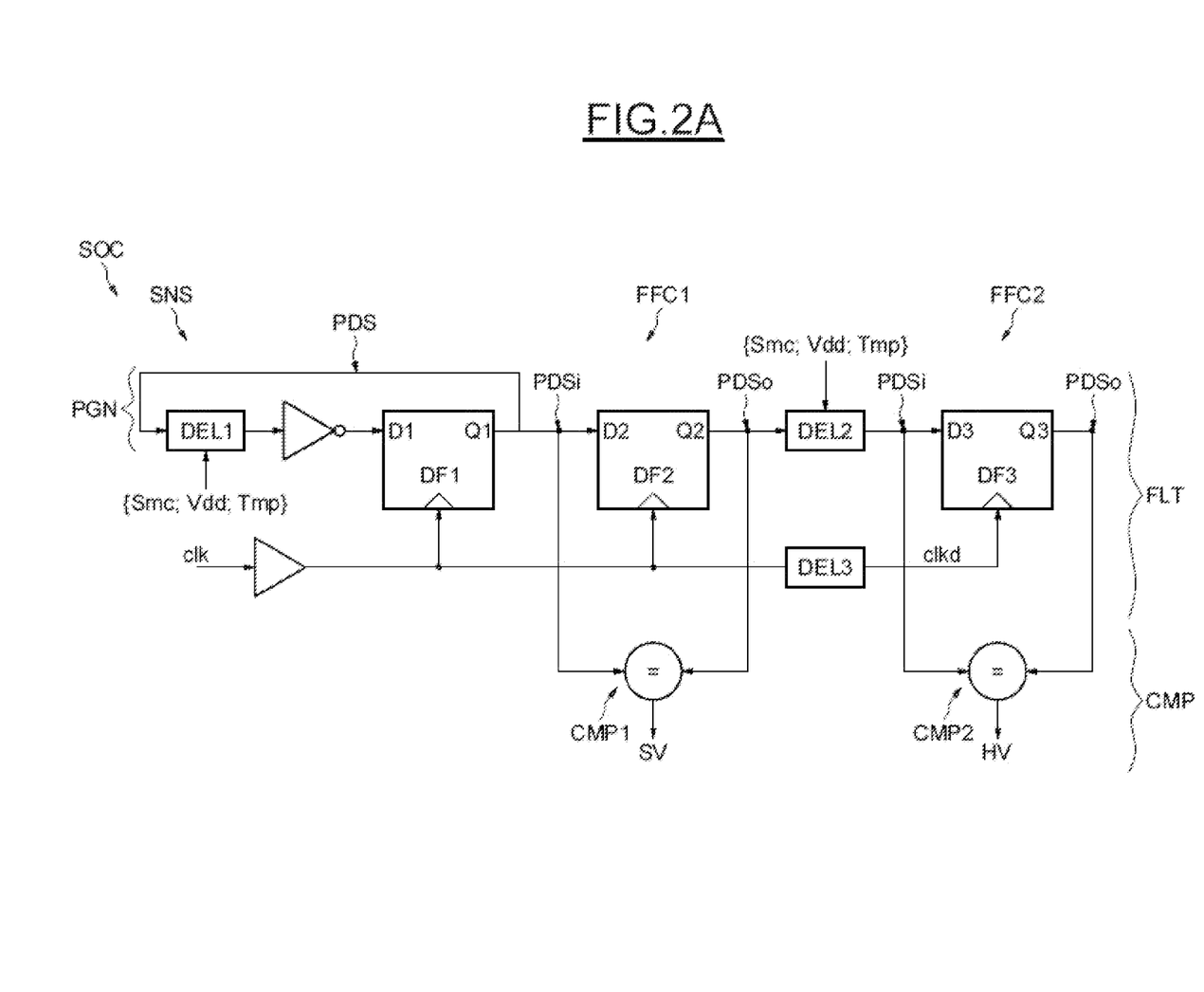
FIG. 2A illustrates an example embodiment of the system-on-chip SOC including a process-voltage-temperature (PVT) sensor.

FIG. 2A illustrates an example embodiment of the system-on-chip SOC including a process-voltage-temperature (PVT) sensor SNS configured to perform the method described in relation with FIG. 1.

The PVT sensor SNS comprises a filter circuit FLT configured to initiate a patterned digital signal PDS and to propagate the patterned digital signal in a manner responsive to variations in semiconductor material Smc, operating supply voltage Vdd and operating temperature Tmp of the system-on-chip SOC. The PVT sensor SNS includes a digital comparison circuit CMP configured to compare the initiated patterned digital signal PDSi and the propagated patterned digital signal PDSo through the filter circuit FLT, and to generate a warning signal SV, HV in case of discrepancies between the compared patterned digital signals.

In this example embodiment, the PVT sensor SNS comprises, in order to initiate the patterned digital signal PDS, a pattern generator PGN configured to generate the patterned digital signal PDS. In this example, the pattern generator includes a feedback inverter circuit coupled from the output Q1 to the input D1 of a first D-type flip-flop DF1. The first D-type flip-flop DF1 is cadenced by a clock signal clk and accordingly generates series of alternated zeros "0" and ones "1" toggling at each clock cycle and forming the digital pattern.

Conventionally, a D-type flip-flop is a synchronous latch configured to capture the value of the "D" (data) input at a definite portion of the clock cycle, such as the rising edge of the clock, the captured value becoming the "Q" output.

In an alternative example embodiment (shown at FIG. 4), the PVT sensor SNS may comprise, in order to initiate the patterned digital signal PDS, a dedicated input configured to receive the patterned digital signal PDS, the patterned digital signal PDS being generated by an external device and transmitted on the dedicated input.

The first D-type flip-flop DF1 is also included in a first flip-flop circuit FFC1 configured to detect a setup violation SV. The first flip-flop circuit comprises a second D-type flip-flop DF2 cadenced by the clock signal clk, and having an input D2 connected to the output Q1 of the first flip-flop DF1, and an output Q1 outputting the propagated patterned digital signal PDSo.

In addition, the first flip-flop circuit FFC1 includes a first delay circuit DELL connected in the feedback loop of the pattern generator PGN, and configured to delay the patterned digital signal at the data input D1 of the first D-type flip-flop DF1.

The first delay circuit DEL1 is illustrated upstream (before) to the inverter in the feedback loop of the pattern generator PGN, but could equally be placed downstream (after) from the inverter in the feedback loop of the pattern generator PGN.

The first delay circuit DEL1, connected in the data path D1, Q1, D2, Q2 of the filter circuit FLT, is configured responsive to variations in semiconductor material Smc, operating supply voltage Vdd and operating temperature Tmp of the system-on-chip SOC.

The digital comparison circuit CMP comprises, for instance, an exclusive-or "XOR" gate receiving the initiated patterned digital signal PDSi (on D2) and the propagated patterned digital signal PDSo (on Q2) in order to output a signal SV corresponding to their comparison (equal or different). By convention, the XOR gate's output can be inverted in order to provide a high level signal "at 1" when the warning signal is triggered, and a low level signal "at 0" when it's not.

Figure 2B:
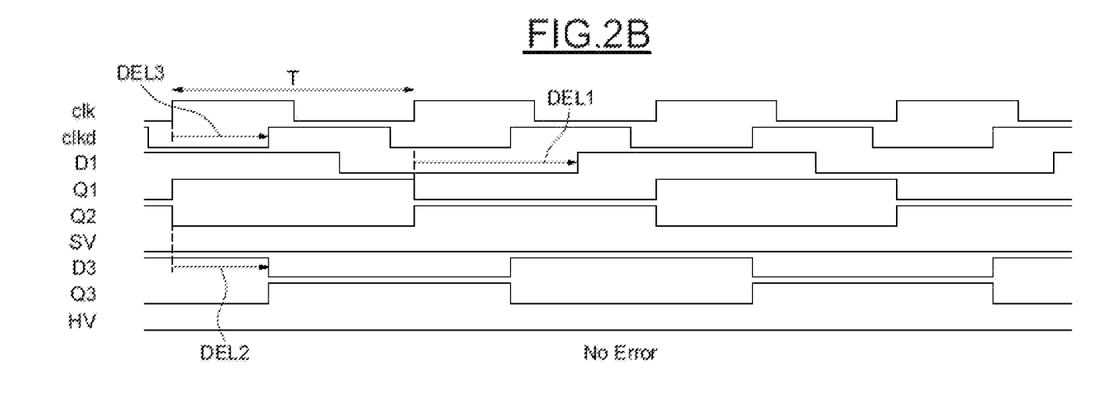
FIGS. 2B, 2C, 2D and 2E illustrate time diagrams of signals related to the filter circuit and comparator depicted in FIG. 2A.
Figure 2C:
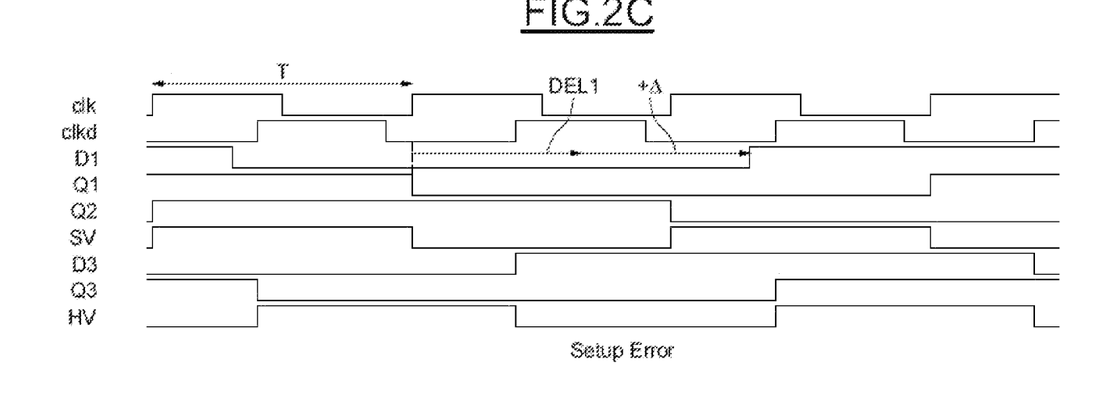
Figure 2D:
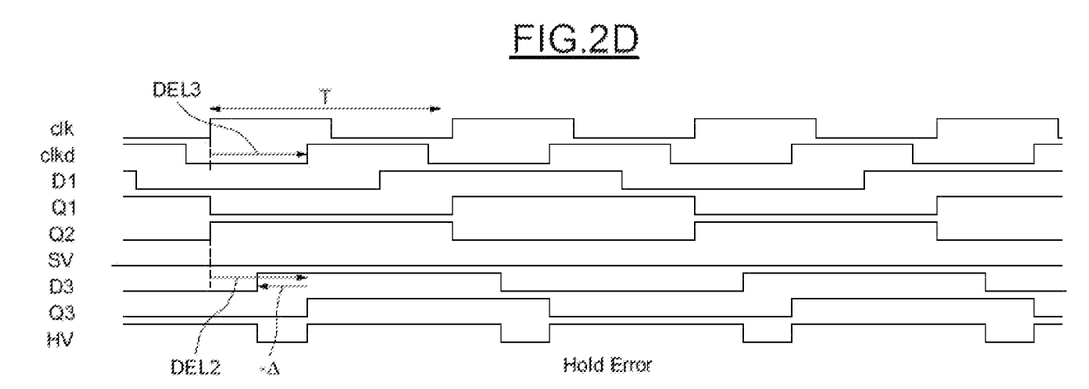
Figure 2E:
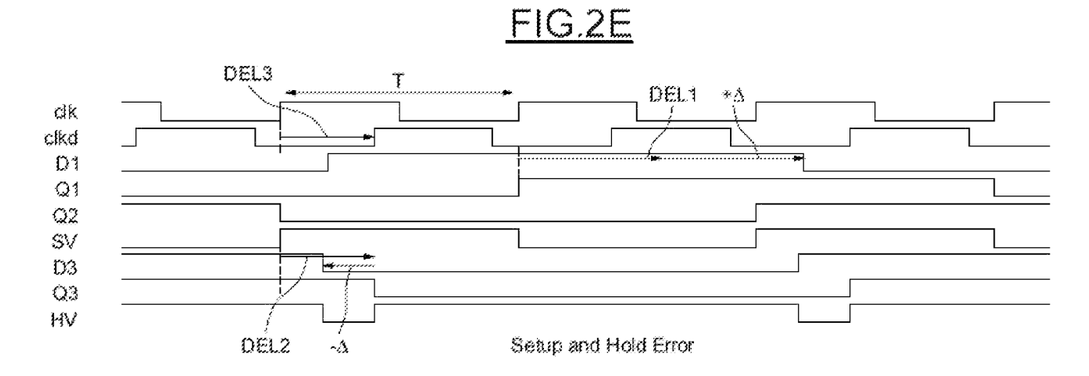

FIGS. 2B, 2C, 2D and 2E illustrate time diagrams of signals related to the filter circuit FLT and comparator CMP depicted in FIG. 2A, in case of a nominal condition's behavior "No Error" on FIG. 2B, in case of a setup violation behavior "Setup Error" on FIG. 2C, in case of a hold violation behavior "Hold Error" on FIG. 2D, and in case of both a setup violation and a hold violation behavior "Setup and Hold Error" on FIG. 2E. The signals related to a respective node of the circuit SNS depicted in FIG. 2A are named with the same reference as the respective node.

We refer now to FIG. 2B "No Error".

The clock signal clk has a constant period T of clock cycles, and at each rising edges of the clock signal clk the D-flip-flop DF1 outputs the signal Q1 at the digital level the data input D1 had at the moment of the rising edge.

The output signal Q1 is delayed by a duration DEL1 and inverted (considered inverted with no delay) to provide the data input signal D1.

In nominal operating conditions, the output Q2 basically corresponds to the output Q1 shifted by one clock cycle. The output Q1 (input D2) and the output Q2 are thus always opposed, such as the warning signal SV is always at 0.

We refer now to FIG. 2C "Setup Error".

FIG. 2C depicts the case when the system on chip SOC is tampered or in conditions of use lowering its speed. In this case, an additional non-nominal delay +Δ is positively added to the duration of the first delay DEL1, because of the first delay circuit DEL1 configured to be sensitive to this modification of operating condition.

Thus, if this additional delay +Δ puts back the next edge of the data input signal D1 after the next rising edge of the clock signal clk, at this next clock signal's rising edge, the level of the data input D1 is remaining at its previous level. Accordingly, the output Q1 does not switch at this clock signal's rising edge and the previous level of Q1 remains during one additional clock cycle.

The second D-type flip-flop circuit DF2 is however cadenced by the clock signal clk and accordingly switches its state to the level provided by Q1.

In consequence, the Q1 signal and the Q2 signal have identical level during a full clock cycle, and opposite levels during another full clock cycle, alternatively.

Thus, the output SV of the XOR comparator circuit is triggered periodically to "1", during alternated full clock cycles, i.e., the periods of time when the Q1 signal and the Q2 signal have identical levels.

This permits to communicate that the system has been slowed down to an amount corresponding to a setup violation of the system on chip SOC.

The duration of the first delay DEL1 can advantageously be specifically configured to provide a margin for generating the warning signal SV. For example, since the warning signal SV is generated as soon as the total duration of the delay DEL1 +Δ is larger than a clock cycle period T, then the nominal duration of the first delay DEL1 can be set lower than the period T by an amount (T-DEL1) providing the tolerance margin for an additional non-nominal delay +Δ before generating the warning signal SV.

We now refer back to FIG. 2A.

The filter circuit FLT additionally includes a second flip-flop circuit FFC2 including a third D-type flip-flop DF3 configured to be cadenced by a delayed clock signal clkd.

The filter circuit FLT comprises a second delay circuit DEL2 configured to introduce a second delay on the patterned digital signal PDS propagated at the output Q2 of the second flip-flop DF2, and a third delay circuit DEL3 configured to introduce a third delay on the clock signal clk, generating the delayed clock signal clkd.

The second delay circuit DEL2 is configured responsive to variations in semiconductor material Smc, operating supply voltage Vdd and operating temperature Tmp of the system-on-chip SOC, while the third delay circuit DEL3 is configured less responsive than the second delay circuit DEL2 to variations in semiconductor material Smc, operating supply voltage Vdd and operating temperature Tmp of the system-on-chip SOC.

For instance, the second delay circuit DEL2 can comprise a digital delay cell, while the third delay circuit DEL3 can comprise a digital buffer which is typically is less sensible to PVT variation than a digital delay cell. For instance, the delay cell is based (by construction) on an internal slope (characteristic of the cell) making it more sensible to the PVT variation.

The second comparator circuit CMP2, for instance comprising an inverted XOR gate, is configured to receive the input D3 of the third flip-flop DF3 (i.e., the delayed patterned digital signal propagated by the second flip-flop DF2 on its output Q2) and the output Q3 of the third flip-flop circuit DF3.

Advantageously, the duration of the second delay DEL2 is larger than the duration of the third delay DEL3.

We refer now to FIG. 2B "No Error".

In the depicted example, the duration of the second delay DEL2 is set approximatively equal to the duration of the third delay DEL3, but the second delay DEL2 is, in the general case, larger than the third delay DEL3.

In consequence, an edge in the output Q2 of the second flip-flop DF2 is delayed, at the input D3 of the third flip-flop DF3, after the next clock cycle of the delayed clock clkd.

In nominal conditions, the output Q3 of the third flip-flop DF3 accordingly takes the previous value of the output Q2 of the second flip-flop DF2 (i.e., the value before the edge in consideration).

When the duration of the second delay DEL2 is approximately equal to the duration of the third delay DEL3, the signal D3 and Q3 are always at opposite levels. Thus, the warning signal HV is constant at the level "0", expressing no hold error.

When the duration of the second delay DEL2 is slightly larger than the duration of the third delay DEL3, the signal D3 and Q3 are mainly at opposite levels, excepted during a short duration of these signal being equals during the time difference between the edge of the delayed clock cycle (delayed by the third delay) and the edge of the data signal (delayed by the second delay).

Thus, the warning signal HV is mainly at the level "0", with short pulses at level "1", communicating no hold error.

We refer now to FIG. 2D "Hold Error".

FIG. 2D depicts the case when the system on chip SOC is tampered or in conditions of use increasing its speed, an additional non-nominal delay −Δ is negatively added to the duration of the second delay DEL2 while the third delay is considered having not varied, because of the second delay circuit DEL2 configured to be more sensitive to this modification of operating condition than the third delay circuit DEL3.

Thus, if this additional negative delay −Δ is large enough to bring forward a considered edge of the delayed data signal D3 (at the input of the third flip-flop DF3) before the next rising edge of the delayed clock signal clkd.

In consequence, an edge in the output Q2 of the second flip-flop DF2 is delayed, at the input D3 of the third flip-flop DF3, before the next clock cycle of the delayed clock clkd.

In these tampered conditions increasing speed, the output Q3 of the third flip-flop DF3 accordingly takes the next value of the output Q2 of the second flip-flop DF2 (i.e., the value after the edge in consideration).

Accordingly, in these tampered conditions, the signals D3 and Q3 are mainly at the same levels during the full clock cycle clkd subsequent to the considered rising edge, excepted during a short duration of these signal being opposite during the time difference between the edge of the delayed clock cycle (delayed by the third delay) and the edge of the data signal (delayed by the second delay and the additional negative delay −Δ).

Thus, the warning signal HV is mainly at the level "1", with short pulses at level "0" periodically at each delayed clock cycle clkd, communicating a "Hold Error".

Furthermore, the difference in durations of the second delay DEL2 and the third delay DEL3 can advantageously be specifically configured to provide a margin for generating the warning signal HV. Indeed, since the warning signal HV is generated as soon as the total duration of the delay DEL2-Δ is smaller than the duration of the third delay DEL3, then the nominal duration of the second delay DEL2 can be set larger than the third delay DEL3 by an amount (DEL2-DEL3) providing the tolerance margin for a negative additional non-nominal delay -Δ before generating the warning signal HV.

It is recalled that it has been considered in this example that the third delay DEL3 does not vary, in the absolute. However, in practice, the third delay DEL3 should actually vary, less than the second delay DEL2, and this variation should be taken into account for establishing the tolerance margin.

FIG. 2E additionally depicts the case when the system on chip SOC is tampered with a complexity permitting to both inject a Setup Error in the datapath and a Hold Error in the clockpath.

The resulting warning signals SV and HV are resulting from a combination of the two cases described before in relation with FIG. 2C and FIG. 2D, in a manner easily deductible from these descriptions and the architecture circuit described in relation with FIG. 2A.

In summary, in that case, the setup violation warning signal SV is triggered periodically to "1", during alternated full clock cycles, while the hold violation warning signal HV is mainly at the level "1", with short pulses at level "0", periodically at each couple of two successive delayed clock cycle clkd.

Figure 3A:
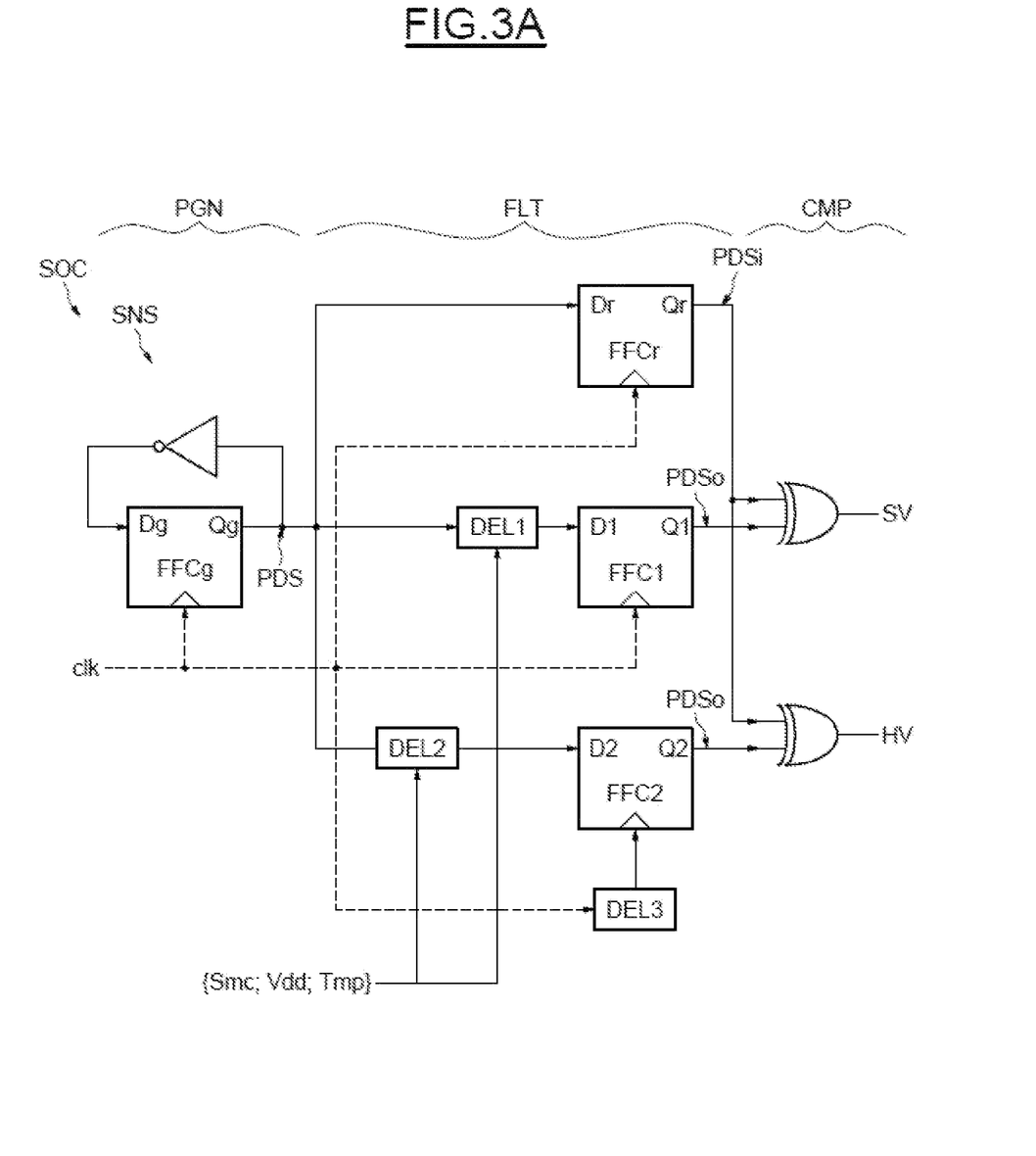
FIG. 3A illustrates another example embodiment of the system-on-chip SOC including a process-voltage-temperature (PVT) sensor.

FIG. 3A illustrates another example embodiment of the system-on-chip SOC including a process-voltage-temperature (PVT) sensor SNS configured to perform the method described in relation with FIG. 1.

The PVT sensor SNS comprises, in order to initiate the patterned digital signal, a pattern generator PGN configured to generate the patterned digital signal PDS. Here again, the pattern generator PGN includes a feedback inverter circuit coupled from the output Qg to the input Dg of a pattern generator flip-flop circuit FFCg. The pattern generator flip-flop circuit FFCg is cadenced by a clock signal clk and accordingly generates series of alternated zeros "0" and ones "1" toggling at each clock cycle and forming the digital pattern.

The PVT sensor SNS comprises a filter circuit FLT including a reference flip-flop circuit FFCr receiving the patterned digital signal on its input Dr and propagating the patterned digital signal on its output Qr triggered by the clock signal clk.

The reference flip-flop circuit FFCr is acting as a synchronizer delaying the pattern of one clock cycle, permitting to have the same behavior as the FFC1 and FFC2 output in case of no error.

The filter circuit FLT includes a first delay circuit DEL1 configured to introduce a first delay DEL1 on the patterned digital signal, in a manner responsive to variations in semiconductor material Smc, operating supply voltage Vdd and operating temperature Tmp of the system-on-chip SOC.

A first flip-flop circuit FFC1 receives the delayed patterned digital signal on its input D1 and propagates the patterned digital signal on its output Q1 triggered by the clock signal clk.

The filter circuit FLT includes a second delay circuit DEL2 configured to introduce a second delay DEL2 on the patterned digital signal, in a manner responsive to variations in semiconductor material Smc, operating supply voltage Vdd and operating temperature Tmp of the system-on-chip SOC.

The filter circuit FLT includes a third delay circuit DEL3 configured to introduce a third delay DEL3 on the clock signal clk, in a manner less responsive than the second delay circuit DEL2 to variations in semiconductor material Smc, operating supply voltage Vdd and operating temperature Tmp of the system-on-chip SOC.

A second flip-flop circuit FFC2 receives the delayed patterned digital signal on its input D2 and propagates the patterned digital signal on its output Q2 triggered by the delayed clock signal.

The comparator circuit CMP includes a first comparator, comprising at least an XOR gate, configured to compare the output signal Qr of the reference flip-flop circuit FFCr with the output signal Q1 of the first flip-flop circuit FFC1.

The comparator circuit CMP includes a second comparator, comprising at least an XOR gate, configured to compare the output signal Qr of the reference flip-flop circuit FFCr with the output signal Q2 of the second flip-flop circuit FFC1.

The comparator circuit CMP according acts in a similar manner than described in relation with FIGS. 2B, 2C, 2D and 2E in order to provide a first warning signal SV with the first comparator communicating a setup violation, and a second warning signal HV with the second comparator communicating a hold violation.

In summary, with reference to FIGS. 3B, 3C, 3D and 3E, respectively corresponding to nominal condition "No Error", slowed tampered conditions "Setup Error", fastened tampered conditions "Hold Error", and combination of both "Setup and Hold Error".

In any of these conditions, the reference flip-flop circuit FFCr acts like a shift register on the patterned digital signal PDS provided on the output Qg of the pattern generator flip-flop circuit FFCg. In other terms, the reference flip-flop circuit FFCr outputs Qr the previous value of its input Qg, at each rising edge of the clock cycle clk.

Figure 3B:
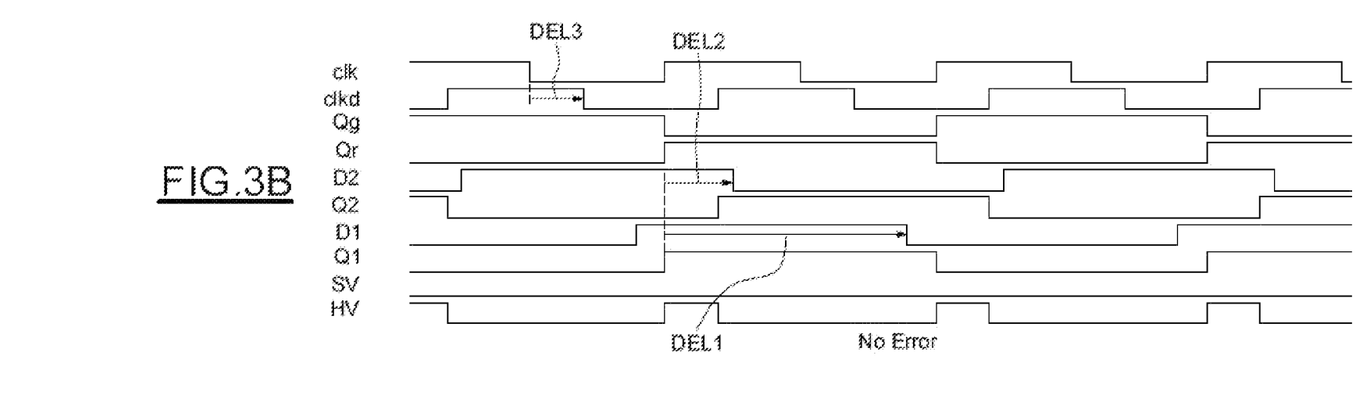
FIGS. 3B, 3C, 3D and 3E illustrate time diagrams of signals related to the filter circuit and comparator depicted in FIG. 3A.

In nominal condition, FIG. 3B "No Error", the first delay DEL1 moves back the edges of the digital patterned signal Qg before the next rising edge of the clock signal clk. Accordingly, the first flip-flop circuit FFC1 outputs Qr the previous value of the patterned digital signal Qg, at each rising edge of the clock signal clk. Thus, the first flip-flop circuit FFC1 acts identically to the reference flip-flop circuit FFCr and the output SV of the first comparator is always "0".

In nominal condition, the second delay DEL2 is larger than the third delay DEL3, and thus the second delay DEL2 moves back the edges of the digital patterned signal Qg after the next rising edge of the delayed clock signal clkd. Accordingly, the second flip-flop circuit FFC2 outputs Qr the previous value of the patterned digital signal Qg, at each rising edge of the delayed clock signal clkd. Thus, the second flip-flop circuit FFC2 acts identically to the reference flip-flop circuit FFCr, but being cadenced by the delayed clock cycles clkd, and the output HV of the second comparator is mainly "0" together with short pulses at "1" periodically at each clock cycle during the duration of the third delay DEL3.

Figure 3C:
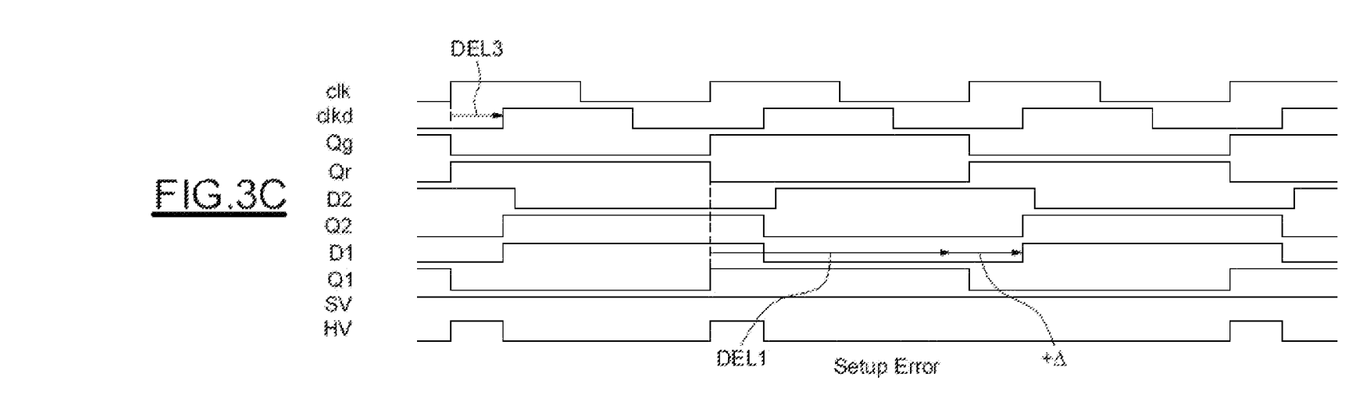

In tampered conditions slowing down the system SOC, FIG. 3C "Setup Error", the first delay DEL1 undergoes an additional positive delay +Δ moving back the edges of the digital patterned signal Qg after the next rising edge of the clock signal clk. Accordingly, the first flip-flop circuit FFC1 outputs Qr the next value of the patterned digital signal Qg, at each rising edge of the clock signal clk. Thus, the first flip-flop circuit FFC1 acts in opposition to the reference flip-flop circuit FFCr and the output SV of the first comparator is always "1".

Figure 3D:
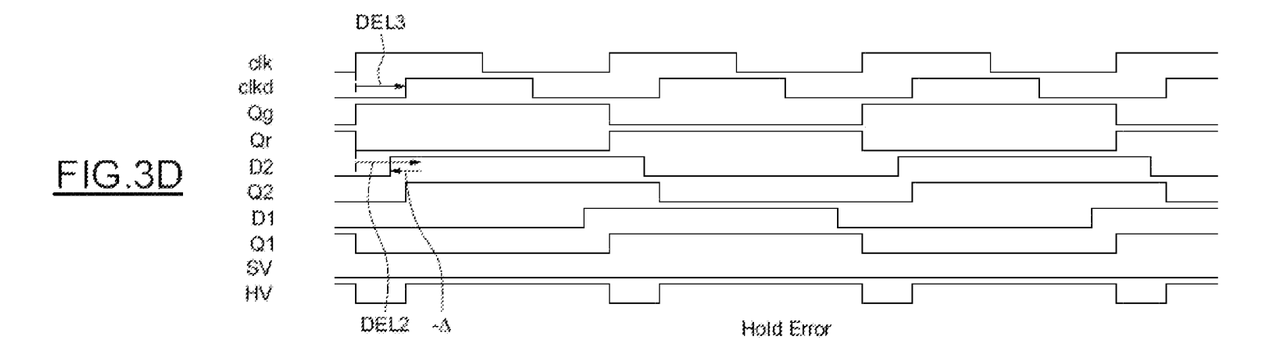

In tampered condition increasing the speed of the system SOC, FIG. 3D "Hold Error", the second delay DEL2 undergoes an additional negative delay $-\Delta$ making it shorter than the third delay DEL3. Thus, the second delay DEL2-$\Delta$ moves back the edges of the digital patterned signal Qg before the next rising edge of the delayed clock signal clkd. Accordingly, the second flip-flop circuit FFC2 outputs Qr the next value of the patterned digital signal Qg, at each rising edge of the delayed clock signal clkd. Thus, the second flip-flop circuit FFC2 acts in opposition to the reference flip-flop circuit FFCr, but being cadenced by the delayed clock cycles clkd, and the output HV of the second comparator is mainly "1" together with short pulses at "0" periodically at each clock cycle during the duration of the difference between the third delay DEL3 and the second delay DEL2-$\Delta$.

Figure 3E:
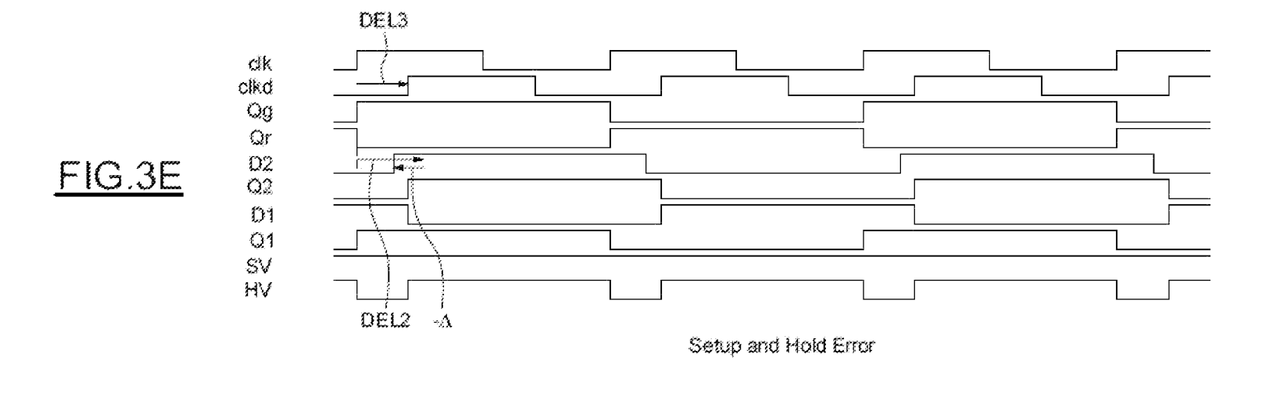

In combination of both tampered conditions, FIG. 3E "Setup and Hold Error", the both results HV and SV are combined, i.e., the output SV of the first comparator is always "1", and the output HV of the second comparator is mainly "1" together with short pulses at "0" periodically at each clock cycle during the duration of the difference between the third delay DEL3 and the second delay DEL2-$\Delta$.

For the record, the digital delay cells of the first and second delay circuits DEL1, DEL2, mentioned hereinbefore and after, may for example include a series of an odd number of inverter circuits, in order to accumulate their intrinsic propagation delays. All or several of the outputs of the inverters can be inputted to a multiplexer in order to control the duration of the delay by selecting the corresponding input of the multiplexer.

Figure 4:
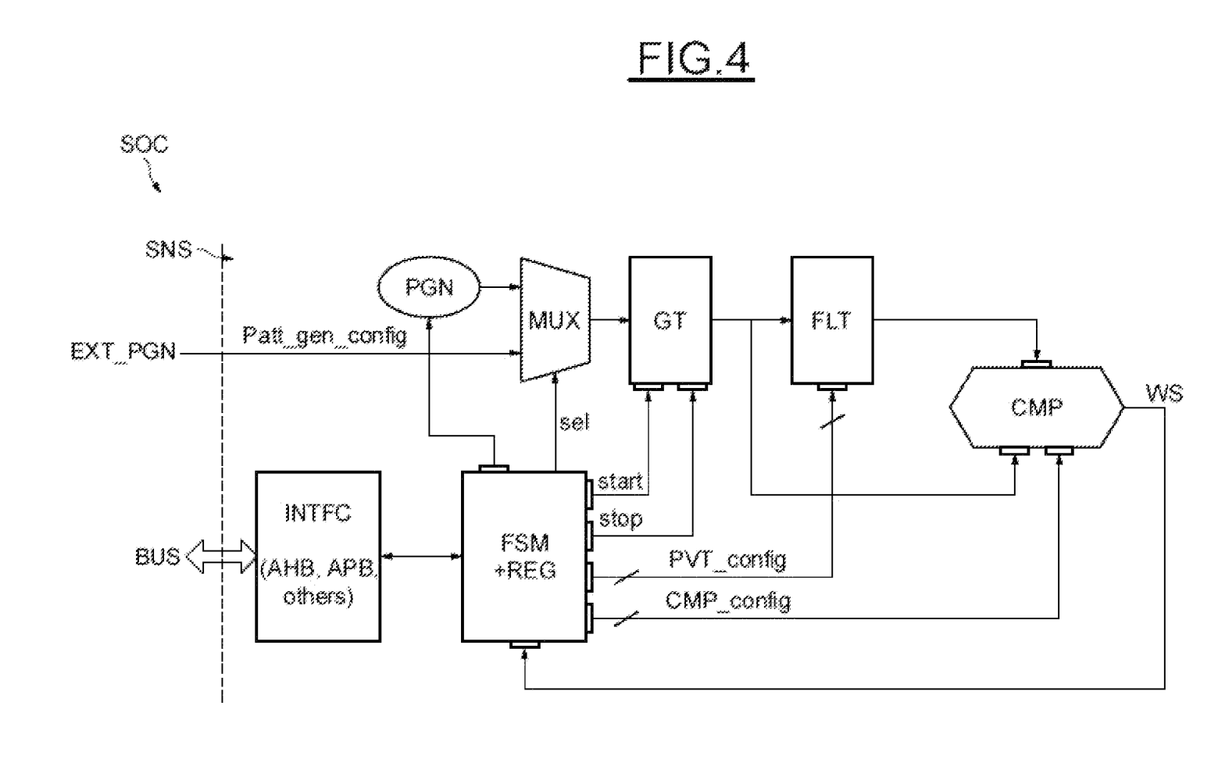
FIG. 4 illustrates an example embodiment in a more high-level point of view of the system-on-chip SOC including a process-voltage-temperature (PVT) sensor.

FIG. 4 illustrates an example embodiment in a more high-level point of view of the system-on-chip SOC including a process-voltage-temperature (PVT) sensor SNS, such as described in relation with FIGS. 2A-2B-2C-2D-2E, and FIGS. 3A-3B-3C-3D-3E.

The PVT sensor SNS thus includes the filter circuit FLT configured to propagate the patterned digital signal, responsive to variations in semiconductor material Smc, operating supply voltage Vdd and operating temperature Tmp of the system-on-chip SOC, and a digital comparison circuit CMP configured to generate a warning signal WS in case of discrepancies between the initiated patterned digital signal and the propagated patterned digital signal.

The PVT sensor includes an initiating stage for initiating the patterned digital signal, comprising an internal pattern signal generator PGN, for instance as described before in relation with FIGS. 2A to 3E, an external input EXT_PGN configured to receive an externally generated patterned digital signal and a multiplexer MUX configured to select the patterned digital signal from the internal source or the external source. A gate circuit GT can be provided at the output of the multiplexer MUX to able or disable the transmission of the patterned digital signal to the filter.

In addition, the PVT sensor SNS comprises a controlling logic unit, for instance a finite state machine FSM, and includes registers REG configured to store internal parameters PVT_config, CMP_config of the filter circuit FLT.

The internal parameters PVT_config, CMP_config are configurable (i.e. adapted to be modified) and determine the response of the filter circuit SNS to variations in semiconductor material Smc, operating supply voltage Vdd and operating temperature Tmp of the system-on-chip.

For instance, the internal parameters include a parameter CMP_config configuring the triggering response of comparator circuit CMP; and include the delay duration of the respective delay circuits PVT_config, for instance in relation with FIGS. 2A to 3E, the duration of delays introduced by the first delay circuit DEL1, the second delay circuit DEL2, and the third delay circuit DEL3.

The controlling logic unit (e.g., finite state machine) FSM, is provided to control the different elements of the PVT sensor, according to control signals received for example from an user or a master device of the system of chip.

For instance, the controlling logic unit (e.g., finite state machine) FSM controls the multiplexer MUX with a selection signal sel; controls the pattern generator circuit PGN with a configuration signal Patt_gen_config; controls the gate circuit GT with start and stop enabling and disabling signals; transmits the internal parameters PVT_config, CMP_config respectively to the filter circuit FLT and to the comparator circuit CMP, and receives the warning signal WS.

Additionally, the PVT sensor SNS includes a bus interface INTFC configured to receive and to emit communications on an internal bus BUS of the system on chip SOC. The internal bus BUS is for instance an AHB-type ("Advanced High-performance Bus") internal bus, APB-type ("Advanced Peripheral Bus") internal bus, or other types of internal buses.

For instance, the PVT sensor SNS is configured to communicate the warning signal WS (setup violation SV or hold violation HV) to a decisional unit Core #1, Core #N (FIG. 5) via the internal bus BUS.

Figure 5:
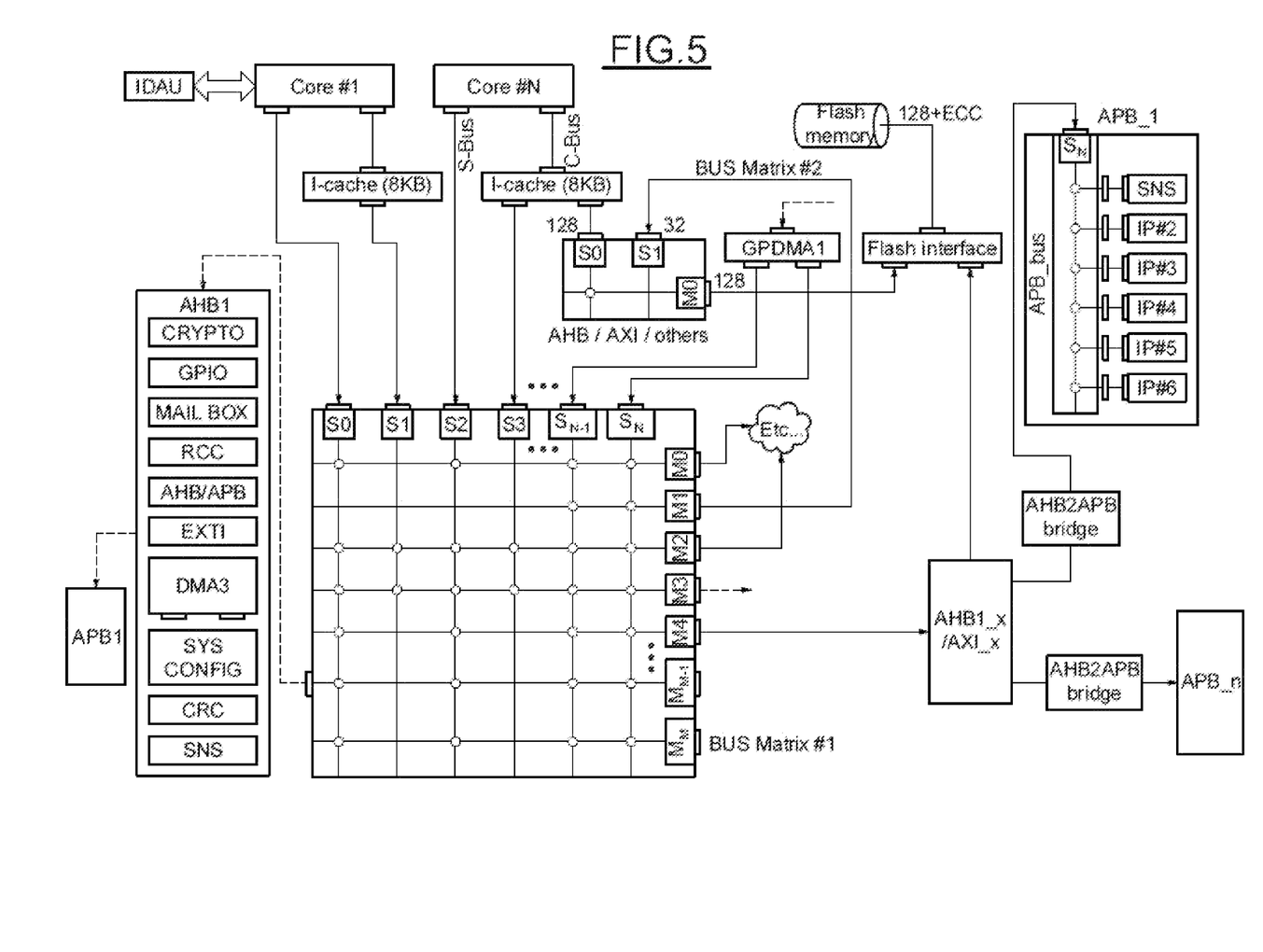
FIG. 5 illustrates a schematic global example of the system on chip SOC including a process-voltage-temperature (PVT) sensor.

FIG. 5 illustrates a schematic global example of the system on chip SOC including a process-voltage-temperature (PVT) sensor SNS, such as described in relation with FIGS. 2A-2B-2C-2D-2E, FIGS. 3A-3B-3C-3D-3E, and FIG. 4.

The system on chip includes in particular at least one master unit Core #1, Core #N, at least one AHB-type internal bus AHB1 and some peripherals CRYPTO, GPIO, . . . , CRC linked to the AHB-type internal bus AHB1, and at least one APB-type internal bus APB bus, and some peripherals IP #2, . . . , IP #6 linked to the APB-type internal bus APB bus.

The internal buses AHB1, APB bus are linking the corresponding peripheral circuits together in a respective bus domain AHB1, APB_1, (APB_n). Each bus domain AHB1, APB_1, (APB_n) may correspond to region of a logical part of the integrated system on chip SOC.

The other element included in the system of chip SOC depicted in FIG. 5, such as "BUS Matrix #1", "Flash memory", "Flash interface", "AHB2APB bridge", "GPDMA1", "I-cache (8 KB)", "MAIL BOX", . . . are conventional example elements known by the person skilled in the art according to their drawing, and are not detailed here since they are not particularly contributing to the aspects related to the PVT sensor SNS.

The PVT sensors SNS are incorporated within the bus domains AHB1 and APB_1 in a physical proximity to the respective peripheral circuits CRYPTO, GPIO, . . . , CRC, and IP #2, . . . , IP #6.

Hence, the PVT sensors SNS are supplied with the same supply voltage and the same clock signal as the peripheral circuits of their respective bus domains AHB1, APB_1.

For example, the PVT sensors SNS include the same components as the components of the peripheral circuits CRYPTO, GPIO, . . . , CRC, and IP #2, . . . , IP #6 which are in the physical proximity to the respective PVT sensors, for instance the same electronics components such as transistors and logical gates.

This permits firstly for the PVT sensors to be sensitive to a tampering of operating condition affecting the semiconductor material of the peripheral circuits, as well as locally applied modifications of operating condition affecting the supply voltage and/or temperature of the peripheral circuits. And, secondly, with an architecture using the same components, the PVT sensors are accurately representative of the actual effects of the operating conditions over the peripheral circuits.

In another hand, the PVT sensors SNS including a bus interface INTFC configured to receive and to emit communications on the internal bus BUS, such as described in relation with FIG. 4, are advantageously capable of being operated like general-purpose peripheral circuits linked on the buses.

Thus, for example the master units Core #1, Core #N configured to execute software operations may communicate configuration commands to the PVT sensors SNS via the internal buses AHB1, APB_bus. The configuration commands are for instance configured to set (i.e. "to change") the internal parameters PVT_config, CMP_config of the PVT sensor SNS.

As mentioned before in relation with FIG. 4, the PVT sensor SNS may be configured to communicate back the warning signal WS to a decisional unit, via the internal bus BUS. The decisional unit may execute countermeasure, such as shutting down the system of chip SOC in case of setup violation SV or hold violation HV warning signals. The decisional unit may be typically included in the master units Core #1, Core #N.

In resume, it has been described embodiments of a system on chip SOC comprising one or more PVT sensors SNS configured to detect an abnormal change in temperature and/or a supply voltage and/or semiconductor behavior of the system on chip SOC, using a reference signal (patterned digital signal) compared to a delayed version of the reference signal or to version propagated with a delayed clock. The elements that introduce the delays are sensitive to changes in process, supply voltage and temperature (PVT).

By properly comparing the reference signal with its delayed versions, it is possible to determine if variations in operating condition respect a normal operating condition or is abnormal, and therefore is indicative of an intrusion attempt by an unauthorized user, or indicative of unsafe external conditions of use.

If the PVT sensor determines an abnormal change in operating condition, then the system on chip SOC may be configured to activate one or more protection measures of the system on chip, depending on the specific application.

As a result, it is apparent that the present disclosure increases the level of security and safety of the system on chip SOC.

The invention claimed is:

1. A system-on-chip, comprising:
a process-voltage-temperature (PVT) sensor, comprising:
a filter circuit configured to receive an input patterned digital signal, propagate the input patterned digital signal in a manner responsive to process variations in semiconductor material, variations in operating supply voltage for the system-on-chip and variations in operating temperature of the system-on-chip, and generate an output patterned digital signal;
wherein the filter circuit comprises:
a first delay circuit configured to delay the input patterned digital signal with a first delay dependent on said process variations in semiconductor material, variations in operating supply voltage for the system-on-chip and variations in operating temperature of the system-on-chip;
a first flip-flop circuit cadenced by a clock signal and having an input configured to receive a first delayed input patterned digital signal output from the first delay circuit;
a second delay circuit configured to delay the input patterned digital signal with a second delay dependent on said process variations in semiconductor material, variations in operating supply voltage for the system-on-chip and variations in operating temperature of the system-on-chip;
a third delay circuit configured to delay the clock signal with a third delay to generate a delayed clock signal; and
a second flip-flop circuit cadenced by the delayed clock signal and having an input configured to receive a second delayed input patterned digital signal output from the second delay circuit; and
a digital comparison circuit configured to compare the input patterned digital signal and a first output patterned digital signal generated at an output of the first flip-flop circuit and generate a first warning signal when the comparison finds signal discrepancies between the input patterned digital signal and the first output patterned digital signal and compare the input patterned digital signal and a second output patterned digital signal generated at an output of the second flip-flop circuit and generate a second warning signal when the comparison finds signal discrepancies between the input patterned digital signal and the second output patterned digital signal.

2. The system-on-chip according to claim 1, wherein the PVT sensor further comprises registers configured to store internal parameters determining a response of the filter circuit to process variations in semiconductor material, variations in operating supply voltage for the system-on-chip and variations in operating temperature of the system-on-chip, wherein the internal parameters are configurable.

3. The system-on-chip according to claim 2, wherein the internal parameters include a duration of said first delay.

4. The system-on-chip according to claim 2, wherein the internal parameters include durations of said first, second and third delays.

5. The system-on-chip according to claim 1, wherein the system-on-chip comprises:
peripheral circuits; and
an internal bus linking the peripheral circuits together in a respective bus domain;
wherein the PVT sensor is incorporated within the bus domain in a physical proximity to the peripheral circuits, and is supplied with a same supply voltage and a same clock signal as the peripheral circuits of the bus domain.

6. The system-on-chip according claim 5, wherein the PVT sensor includes same components as the components of the peripheral circuits in the physical proximity to the PVT sensor.

7. The system-on-chip according to claim 5, wherein the PVT sensor includes a bus interface configured to receive and to emit communications on the internal bus.

8. The system-on-chip according to claim 7,
wherein the PVT sensor includes registers configured to store internal parameters determining a response of the filter circuit dependent on process variations in semiconductor material, variations in operating supply voltage for the system-on-chip and variations in operating temperature of the system-on-chip, wherein the internal parameters are configurable; and wherein the system-on-chip includes a master unit configured to execute software operations comprising communicating configuration commands to the PVT sensor via the internal bus, the configuration commands being configured to set the internal parameters.

9. The system-on-chip according to claim 7, wherein the PVT sensor is configured to communicate the first and second warning signals to a decisional unit via the internal bus.

10. A system-on-chip, comprising:
a process-voltage-temperature (PVT) sensor, comprising:
a filter circuit configured to receive an input patterned digital signal, propagate the input patterned digital signal in a manner responsive to process variations in semiconductor material, variations in operating supply voltage for the system-on-chip and variations in operating temperature of the system-on-chip, and generate an output patterned digital signal;
wherein the filter circuit comprises:
a first flip-flop circuit cadenced by a clock signal and configured to propagate the input patterned digital signal as a first output patterned digital signal;
a first delay circuit configured to delay the first output patterned digital signal with a first delay dependent on said process variations in semiconductor material, variations in operating supply voltage for the system-on-chip and variations in operating temperature of the system-on-chip;
a second delay circuit configured to delay the clock signal with a second delay to generate a delayed clock signal; and
a second flip-flop circuit cadenced by the delayed clock signal and having an input configured to receive a further input patterned digital signal output from the first delay circuit; and
a digital comparison circuit configured to compare the input patterned digital signal and the first output patterned digital signal and generate a first warning signal when the comparison finds signal discrepancies between the input patterned digital signal and the first output patterned digital signal and compare the further input patterned digital signal and a second output patterned digital signal generated at an output of the second flip-flop circuit and generate a second warning signal when the comparison finds signal discrepancies between the further input patterned digital signal and the second output patterned digital signal.

11. The system-on-chip according to claim 10, wherein the PVT sensor further comprises registers configured to store internal parameters determining a response of the filter circuit to process variations in semiconductor material, variations in operating supply voltage for the system-on-chip and variations in operating temperature of the system-on-chip, wherein the internal parameters are configurable.

12. The system-on-chip according to claim 11, wherein the internal parameters include a duration of said first delay.

13. The system-on-chip according to claim 11, wherein the internal parameters include a duration of said first and second delays.

14. The system-on-chip according to claim 10, wherein the system-on-chip comprises:
peripheral circuits; and
an internal bus linking the peripheral circuits together in a respective bus domain;

wherein the PVT sensor is incorporated within the bus domain in a physical proximity to the peripheral circuits, and is supplied with a same supply voltage and a same clock signal as the peripheral circuits of the bus domain.

15. The system-on-chip according claim 14, wherein the PVT sensor includes same components as the components of the peripheral circuits in the physical proximity to the PVT sensor.

16. The system-on-chip according to claim 14, wherein the PVT sensor includes a bus interface configured to receive and to emit communications on the internal bus.

17. The system-on-chip according to claim 16,
wherein the PVT sensor includes registers configured to store internal parameters determining a response of the filter circuit dependent on process variations in semiconductor material, variations in operating supply voltage for the system-on-chip and variations in operating temperature of the system-on-chip, wherein the internal parameters are configurable; and wherein the system-on-chip includes a master unit configured to execute software operations comprising communicating configuration commands to the PVT sensor via the internal bus, the configuration commands being configured to set the internal parameters.

18. The system-on-chip according to claim 16, wherein the PVT sensor is configured to communicate the first and second warning signals to a decisional unit via the internal bus.

19. A method for sensing process-voltage-temperature (PVT) variations in a system-on-chip, comprising:
generating an input patterned digital signal;
propagating the input patterned digital signal by a filter circuit in a manner responsive to process variations in semiconductor material, variations in operating supply voltage for the system-on-chip and variations in operating temperature of the system-on-chip to generate an output patterned digital signal;
wherein propagating the input patterned digital signal comprises:
applying a first delay on the input patterned digital signal wherein the first delay is dependent on process variations in semiconductor material, variations in operating supply voltage for the system-on-chip and variations in operating temperature of the system-on-chip;
passing a first delayed patterned digital signal output from the first delay through a first flip-flop circuit cadenced by a clock signal;
applying a second delay on the input patterned digital signal wherein the second delay is dependent on process variations in semiconductor material, variations in operating supply voltage for the system-on-chip and variations in operating temperature of the system-on-chip;
applying a third delay on the clock signal to generate a delayed clock signal; and
passing a second delayed patterned digital signal output from the second delay through a second flip-flop circuit cadenced by the delayed clock signal;
digitally comparing the input patterned digital signal and a first output patterned digital signal generated by the first flip-flop circuit;
generating a first warning signal in response to detection of discrepancies between the input patterned digital signal and the first output patterned digital signal;

digitally comparing the input patterned digital signal and a second output patterned digital signal generated by the second flip-flop circuit; and generating a second warning signal in response to detection of discrepancies between the input patterned digital signal and the second output patterned digital signal.

20. The method according to claim 19, further comprising storing internal parameters determining the response of the filter circuit to process variations in semiconductor material, variations in operating supply voltage for the system-on-chip and variations in operating temperature of the system-on-chip, wherein the internal parameters are configurable.

21. The method according to claim 20, wherein the internal parameters include a duration of the first delay.

22. The method according to claim 20, wherein the internal parameters include durations of the first, second and third delays.

23. The method according to claim 19, wherein sensing process-voltage-temperature (PVT) variations is performed in a physical proximity to peripheral circuits linked together by an internal bus in a respective bus domain of the system-on-chip, and performed with a same supply voltage and a same clock signal as the peripheral circuits of the bus domain.

24. The method according to claim 23, wherein sensing process-voltage-temperature (PVT) variations is performed with same components as the components of the peripheral circuits in the physical proximity to the sensing.

25. The method according to claim 23, further comprising storing internal parameters determining the response of the filter circuit to process variations in semiconductor material, variations in operating supply voltage for the system-on-chip and variations in operating temperature of the system-on-chip, wherein the internal parameters are configurable; and receiving and emitting communications on the internal bus via a bus interface including communication of configuration commands configuring the internal parameters, emitted from a master unit of the system-on-chip configured to execute software operations.

26. The method according to claim 25, comprising communicating the first and second warning signals to a decisional unit of the system-on-chip via the internal bus.

27. A method for sensing process-voltage-temperature (PVT) variations in a system-on-chip, comprising:
generating an input patterned digital signal;
propagating the input patterned digital signal by a filter circuit in a manner responsive to process variations in semiconductor material, variations in operating supply voltage for the system-on-chip and variations in operating temperature of the system-on-chip to generate an output patterned digital signal;
wherein propagating the input patterned digital signal comprises:
passing the input patterned digital signal through a first flip-flop circuit cadenced by a clock signal to generate a first output patterned digital signal; and
applying a first delay on the first output patterned digital signal to generate a further input patterned data signal;
applying a second delay on the clock signal to generate a delayed clock signal;
passing the further input patterned data signal through a second flip-flop circuit cadenced by the delayed clock signal;
wherein the first delay and second delay are dependent on process variations in semiconductor material, variations in operating supply voltage for the system-on-chip and variations in operating temperature of the system-on-chip;
digitally comparing the input patterned digital signal and the first output patterned digital signal generated by the first flip-flop circuit;
generating a first warning signal in response to detection of discrepancies between the input patterned digital signal and the first output patterned digital signal;
digitally comparing the further input patterned digital signal and a second output patterned digital signal generated by the second flip-flop circuit; and
generating a second warning signal in response to detection of discrepancies between the further input patterned digital signal and the second output patterned digital signal.

28. The method according to claim 27, further comprising storing internal parameters determining the response of the filter circuit to process variations in semiconductor material, variations in operating supply voltage for the system-on-chip and variations in operating temperature of the system-on-chip, wherein the internal parameters are configurable.

29. The method according to claim 28, wherein the internal parameters include a duration of the first delay.

30. The method according to claim 28, wherein the internal parameters include a duration of the first and second delays.

31. The method according to claim 27, wherein sensing process-voltage-temperature (PVT) variations is performed in a physical proximity to peripheral circuits linked together by an internal bus in a respective bus domain of the system-on-chip, and performed with a same supply voltage and a same clock signal as the peripheral circuits of the bus domain.

32. The method according to claim 31, wherein sensing process-voltage-temperature (PVT) variations is performed with same components as the components of the peripheral circuits in the physical proximity to the sensing.

33. The method according to claim 31, further comprising storing internal parameters determining the response of the filter circuit to process variations in semiconductor material, variations in operating supply voltage for the system-on-chip and variations in operating temperature of the system-on-chip, wherein the internal parameters are configurable; and receiving and emitting communications on the internal bus via a bus interface including communication of configuration commands configuring the internal parameters, emitted from a master unit of the system-on-chip configured to execute software operations.

34. The method according to claim 33, comprising communicating the first and second warning signals to a decisional unit of the system-on-chip via the internal bus.

* * * * *